United States Patent [19]

Moore

[11] Patent Number: 5,756,571
[45] Date of Patent: May 26, 1998

[54] INTUMESCENT THERMOPLASTIC POLYAMIDE GRAFT POLYMERS

[75] Inventor: William Percy Moore, Hopewell, Va.

[73] Assignee: Agrinutrients Company, Inc., Disputanta, Va.

[21] Appl. No.: 799,842

[22] Filed: Feb. 13, 1997

[51] Int. Cl.$^6$ .................................................. C08G 69/48
[52] U.S. Cl. ........................... 524/425; 524/445; 524/606; 525/420; 525/424; 525/426; 525/432
[58] Field of Search ................................ 525/420, 428, 525/432, 424, 426; 524/425, 445, 606

[56] References Cited

U.S. PATENT DOCUMENTS

| | | | |
|---|---|---|---|
| 3,660,344 | 5/1972 | Michael | 524/100 |
| 3,793,289 | 2/1974 | Koch | 524/100 |
| 3,950,306 | 4/1976 | Pews | 524/101 |
| 3,980,616 | 9/1976 | Kimura | 524/101 |
| 4,001,177 | 1/1977 | Tsutsumi | 524/101 |
| 4,085,283 | 4/1978 | Den Otter | 544/214 |
| 4,180,496 | 12/1979 | Yanagimoto | 524/101 |
| 4,298,518 | 11/1981 | Ohmura | 524/101 |
| 4,317,766 | 3/1982 | Kawasaki | 524/101 |
| 4,341,694 | 7/1982 | Halpern | 252/606 |
| 4,363,890 | 12/1982 | Ohshita | 524/101 |
| 4,452,931 | 6/1984 | Okamoto | 524/100 |
| 4,574,154 | 3/1986 | Okamoto | 544/192 |
| 4,789,698 | 12/1988 | Bonten | 524/100 |
| 5,198,483 | 3/1993 | Gainer | 524/100 |

*Primary Examiner*—Patricia A. Short

[57] ABSTRACT

An intumescent fire retardant graft polyamide polymer aving resistance to dripping on exposure to fire, and the method of making such graft polyamide polymers, comprising from about 10–40 percent by weight of a melamine compound, 40–95 percent of a thermoplastic polyamide polymer, and 1–10 percent of an oligomer containing 1–4 monomer units of, or reactive with, the polyamide polymer. The graft polymer is formed at about the melting temperature of the polyamide. Caprolactam, and adipic acid-hexamethylene diamine oligomers perform well in forming the graft polyamides with melamine compounds. Effective melamine compounds are melamine, melamine cyanurate, melamine phosphate, melamine borate, methylol melamine, and trimelamine isocyanurate. Extraneous materials such as fiber, glass, and antioxidants may be added to affect the physical properties of the product.

20 Claims, No Drawings

INTUMESCENT THERMOPLASTIC POLYAMIDE GRAFT POLYMERS

FIELD OF THE INVENTION

The present invention is directed to a method of grafing melamine compounds onto a thermoplastic polyamide polymer using an oligomer of the polyamide to secure the graft, and to the fire and drip resistant thermoplastic polyamide polymers produced thereby, while substantially retaining the physical properties of the polyamide.

BACKGROUND OF THE INVENTION

The fire retarding properties of s-triazine compounds, including melamine, particularly in the form of a melamine-formaldehyde resin, have been known in the art for a long time and have been used commercially in some products. Melamine is preferred for use as a fire retardant over the commonly used halogenated organics, antimonies, and heavy metal compounds because melamine has a lower toxicity than those materials.

The art describes the use of s-triazine compounds as flame proofing agents for polyamide resins. However, where the treatment of polyamide thermoplastics is described in the art, the s-triazine compound is utilized only in a minor amount. It is combined with the polyamide by simple blending as opposed to being incorporated into the polyamide structure itself. It is usually required to be utilized with a second flame proofing agent in order to provide satisfactory fire retardant properties to the end product. The art recognizes that when a high concentration of a flame proofing agent is utilized, that the physical properties of the polyamide is detrimentally affected.

The art recognizes shortcomings in utilizing melamine alone as a fire proofing agent for polyamides. Relevant patents in this regard include U.S. Pat. Nos. 4,180,496; 4,574,154; and 4,452,931. For example, '496 states that melamine alone is not satisfactory as a fire retardant on the basis that: (1) polyamides are made at a temperature in the range of from 200° C. to 300 ° C. and melamine decomposes at these temperatures; (2) melamine sublimes at temperatures higher than 220 ° C. and bubbles thereby deteriorating the mechanical properties of the polyamide; and (3) the miscibility of melamine is not good in polyamides thereby necessitating the pulverization of the melamine.

Patents describing the use of melamine alone as a fire retardant include, for example, U.S. Pat. Nos. 3,660,344; 4,789,698; and 4,180,496.

U.S. Pat. No. 3,660,344 discloses the use of 0.5%–25% of melamine or a derivative thereof with a polyamide. In making the fire retardant product, the polyamide and melamine are homogeneously mixed in an extruder. No suitable temperature is described for use in mixing or extrusion of the mixture. In the examples set forth, all of the additives are included in an amount below 10%.

U.S. Pat. No. 4,789,698 discloses a mixture of nylons 6 or 66; 3%–35% of melamine, melamine cyanurate or a mixture thereof; and 5%–45% of unsized glass fibers. The mixture is extruded at a temperature of 285° C.–290° C. In the examples, 15 parts of melamine are present and the extrusion is carried out at 280° C.

U.S. Pat. No. 4,180,496 is directed to the use of an adduct of two specified s-triazine compounds as a fire retardant. However, the comparative examples show that melamine alone is insufficient as compared to the adduct of the invention. Twenty percent of melamine was utilized in the comparative example. The melamine was blended with the polyamide in a ball mill. The comparative example product was shown to not have overall properties as good as the product containing the adduct.

The prior art additionally discloses the use of various other s-triazine compounds alone as fire retardants for polyamides. For example, U.S. Pat. No. 4,363,890 discloses the use of a melamine cyanurate in an amount of 1%–30%. The fire retardant is melt blended with a polyamide at a temperature of 5° C.–80° C. higher than the melting point of the polyamide. U.S. Pat. No. 3,980,616 discloses the use of from 0.5%–20% of cyanuric acid. The cyanuric acid is added to a polyamide after polymerization of the polyamide at a temperature between the softening point of the polyamide and 250° C. U.S. Pat. No. 4,085,283 discloses the use of a phosphorus or nitrogen containing compound, such as tris(2-hydroxyethyl)isocyanate or cyanuric acid, in an amount of 5%–50%. The fire retardant can be added to the polyamide by any conventional means such as mixing, coating or as a comonomer during the polymerization process. When the fire retardant is utilized as a comonomer, however, an —OH group must be present in the structure of the comonomer.

Various blends of compounds are disclosed in the art suitable for use as fire retardants, including where one of the compounds of the blend is melamine. Examples include U.S. Pat. Nos. 4,321,189; 4,001,177; and 4,341,694. The '189 patent is directed to the blend of melamine and cyanuric acid in an amount of 1%–30% and involves melt blending of the fire retardant blend with a polyamide at a temperature of 5° C.–80° C. higher than the melting point of the polyamide.

Additional art describing the treatment of polyamide compounds with flame proofing agents include U.S. Pat. Nos. 4,298,518; 3,793,289; 4,317,766; 3,843,650; and 3,950,306 which describe the use of a substituted triazine compound or a melamine derivative as a flameproofing agent for polyamide resins. Each of the '518, '289, and '766 patents disclose that when the specified flameproofing agent is utilized in a higher concentration, that the mechanical properties of the product produced are adversely affected.

The effect of particle size on a fire proofing agent is noted in U.S. Pat. No. 4,317,766 which states that the particle size of the fire retardant should be at most 35 microns with at least 80% being at most 10 microns. The '766 patent describes the use of melamine cyanurate in an amount of 2%–25% as the fire retardant. The melamine cyanurate is added during the polymerization process. However, the patent specifically states that the melamine cyanurate does not react with the polymer components.

No mention was found in the prior art of trimelamine isocyanurate as an effective fire retardant for polyamides.

Accordingly, the present invention which provides for the incorporation of a high concentration of a non-resinous melamine compound, and an oligomer reactive with the polyamide polymer, into the structure of a polyamide thermoplastic polymer, to form a graft polymer containing a polyamide as a component thereof, by grafting the melamine and the oligomer to the polyamide at about the melting temperature of the polyamide is not shown in the art. The art, in fact, teaches that the use of an excessive amount of certain triazine or melamine derivative compounds with a polyamide is detrimental to the physical properties of the polyamide.

In this disclosure, a graft polymer is defined as a polymer where property modifying compounds or oligomers are attached to the skeletal chain of a polymer at a monomer coupling site by additive reaction, usually as a side chain. Oligomer is defined as a compound where several monomer chemicals, usually less than 5 monomer units, have combined, and which can be polymerized to form high polymers. Oligomers are usually formed by condensation of several monomer units, but may be formed by depolymerizing high polymers.

Non-burning used herein means capable of being rated V-O under the Underwriters Laboratory (U.L.) Test Method 94. U.L.Test Method 94 determines the distance which a test piece burns before it self-extinguishes as described in U.L. literature describing the test procedure. A V-O rating indicates that the test piece did not burn for any appreciable time or distance when the test piece was removed from a fire source.

Intumescence is heat and fire induced degradation of the surface of a fire retarding material with the formation of a crusty foam on the surface which insulates the remaining material from the heat and fire. The crusty foam also excludes air necessary for combustion of the remainder of the fire retarding material. Further, the intumescence of the melamine compounds is endothermic so that the surface is cooled during the formation of the crusty foam coating of the fire retardant materials.

OBJECTS OF THE INVENTION

A primary object of the present invention is to provide a method of producing a fire resistant intumescent thermoplastic polyamide graft polymer wherein non-resinous melamine compounds and oligomers reactive with both the melamine and polyamide are grafted onto the polyamide polymer skeletal chain by coreacting the melamine compound, the polyamide, and the oligomer.

A further primary object of the present invention is to provide a method of producing an intumescent graft polymer of a polyamide thermoplastic polymer having a non-resinous melamine compound present as a part of the polymer structure which involves incorporating by coreaction of a melamine compound, an oligomer, and the polyamide polymer at about the melting temperature of the polyamide.

A further primary object of the present invention is to provide a method of producing a fire and drip resistant intumescent thermoplastic polyamide graft polymer from a thermoplastic polyamide polymer, an oligomer reactive with the polymer, and a melamine compound reactive with the oligomer, wherein the melamine reacts with the oligomer before, or at the same time, that the oligomer is grafted to the polyamide polymer skeletal chain.

BRIEF DESCRIPTION OF THE INVENTION

The intumescent fire and drip resistant graft polymer products of the present invention are obtained by admixing a thermoplastic polyamide polymer, an oligomer reactive with the polymer, and a substantial amount of a melamine compound reactive with the oligomer, and coreacting these ingredients at about the melting temperature of the polyamide polymer until the graft polymer is obtained. Coreaction is usually provided by thermal means alone, but a small amount of polymerization catalyst combined with heat improves the reaction rate.

The formation of the graft polymer of the present invention is indicated by the homogeneity of the product, the inseparability of the melamine, the water insolubility of the melamine, the injection molding effectiveness of the graft polymer, and the fire and drip resistance of the product.

More particularly, the composition of the graft polymers of the present invention comprises: non-resinous melamine compounds, containing at least one amino group on its molecular ring available for reaction, in an amount of from 10 to 40 percent based on the weight of the total mixture used to form the composition, preferably in the range of from 24 to 30 percent; an oligomer reactive with the melamine compounds and the polyamide, containing from 1 to 4 monomer units of the thermoplastic polyamide polymer in an amount of from 1 to 10 percent, preferably from 1 to 5 percent, and most preferably from 2 to 4 percent; and a polyamide thermoplastic polymer, exhibiting a property of forming graft polymers with its oligomers, amounting to from 40 to 95 percent by weight, preferably from 70 to 90 percent and most preferably from 72 to 80 percent.

The composition is coreacted by mixing and heating with, or without, a catalyst to about the melting point of the polyamide until the grafting reaction is completed and the melaine compound is chemically bound to the polyamide polymer via the oligomer. The composition is then quickly cooled below its softening point in about one minute to prevent degradation of the polymer.

The physical properties of the grafted polyamide may be changed by adding extraneous materials such as glass fibers, limestone, colors, and antioxidants before, or after, the grafting reaction is completed, preferably after the reaction is completed.

DESCRIPTION OF THE INVENTION

The present invention is directed to an intumescent fire retardant material resistant to dripping in fire environments and to a method of preparing this fire retardant product, involving grafting a melamine compound to a thermoplastic polyamide polymer through a reactive oligomer, without detrimentally affecting the physical properties of the polyamide thermoplastic. The physical properties of particular concern are the tensile strength, flexibility, and elongation or elasticity of the polymers formed.

Thermoplastic polymers which are suitable for use in the present invention include polyamides derived from the polycondensation of a linear dicarboxylic acid and a linear diamine. Some minor branching of the linear chains is acceptable. Additional suitable polyamides are polymers produced by the polymerization of a lactam having a ring with more than 3 members, or a polymer of an alpha amino acid. Preferred polyamide polymers are nylons such as nylon-6, i.e. the polycondensation product of caprolactam; and nylon-66, i.e. the polycondensation product of adipic acid and hexamethylene diamine; and amino caproic acid. The thermoplastic polyamides suitable for use in the present invention must be capable of reacting with oligomers containing 1 to 4 monomer units of the thermoplastic polyamide polymer and melamine compounds at temperatures of about the melting temperature of the thermoplastic polyamide polymer to form a graft polymer. "Thermoplastics" is used herein as is conventional to describe polymers which increase in plasticity upon increases in temperature. When the temperature has become sufficiently high, the thermoplastic material becomes fluid. The plasticity of the thermoplastic decreases as the temperature decreases until the material returns to its original physical properties.

The oligomers effective in the present invention are low molecular weight condensations of monomer units reactive with the melamine compounds at the melamine's available amino group sites, and also with the polyamide polymer, at the site of monomer coupling to form graft polymers. The oligomers are particularly effective when they comprise between 1 and 4 monomer units of the polyamide polymer to be reacted. Oligomers containing more than 4 monomer units are difficult to react with melamine compounds and, therefore, do not form ternary graft compounds including melamine as effectively as the lower molecular weight oligomers. In some cases, the effective oligomer may comprise a single monomer unit, as in the cases of caprolactam and maleic anhydride.

The oligomer usually comprises several monomer units of the polymer being reacted, such as using an adipic acid-hexamethylene diamine oligomer to graft melamine compounds to nylon-66. However, other oligomers may be used in lieu of the polyamide oligomers so long as they are sufficiently reactive with the polyamide polymer and the melamine compounds to form a graft polymer. Oligomers found to effectively graft melamine compounds to polyamide polymers include oligomers containing 1 to 4 monomers units of caprolactam, hexamethylene diamine-adipic acid reaction product, maleic anhydride, and methylene di-para-phenylene isocyanate (MDI).

The oligomers useful in the present invention are usually formed by condensation of monomers. It was also found possible to form the oligomers by depolymerization of high polymers.

The melamine compounds effectively utilized in the present invention are non-resinous compounds, i.e. the materials have not been polymerized and are capable of reacting with an oligomer which will react with a thermoplastic polyamide polymer. Thus, as used herein, non-resinous melamine includes molecular melamine compounds in unpolymerized form. It was found necessary that these melamine compounds contain one or more amino groups (—NH$_2$) on the melamine ring which are unreacted and available to react additively with a thermoplastic polymer oligomer to form a graft polymer.

Several melamine compounds, exhibiting at least one amino group available for reaction, have been found effective in the present invention. Melamine exhibits three available amino groups and is effective. Trimelamine isocyanurate exhibits more available amino groups, and is more effective. Melamine salts, including melamine phosphate and melamine borate are effective in forming grafts with the polyamide polymers and oligomers. Other melamine compounds found effective include methylol melamine, and melamine cyanurate.

When the non-resinous melamine is grafted to a polyamide thermoplastic polymer by the method of the present invention, a fire and drip resistant product is produced which does not puddle in fire environments. The term "drip" is understood to mean the characteristic action of most thermoplastic solids upon their exposure to the high temperature conditions present with fire. Generally, solid thermoplastic materials melt and form low viscosity liquids which flow or drip in a fire environment. "Puddle" refers to another characteristic action, which is related to drip, of most thermoplastic solids when exposed to fire. "Puddling" occurs when solid thermoplastics melt to form low viscosity liquids which run or drip to form puddles of thin liquid resin. This liquid resin becomes separated from any fire retarding solid(s) which may have been originally blended with the thermoplastic. Puddling and dripping substantially reduce or eliminate the beneficial effects of most solid fire retardants present in or with the thermoplastic and can actually spread a fire to new fuels or areas.

Resinous or polymeric melamine materials, such as melamine-formaldehyde resin, are not suitable for use in the present invention. These materials produce undesirable properties since they do not form an effective graft with thermoplastic materials, and accordingly, degrade the physical properties of the thermoplastic. Molecular melamine is effective in the method of the present invention since it has amino groups capable of reacting with oligomers and by that means forming grafts with polyamide thermoplastic polymer while maintaining or improving the physical properties of the thermoplastic polymers and providing the maximum fire retarding effects of the melamine to the thermoplastic polyamide component.

The graft polymers produced using the method of the present invention are rendered fire retardant and drip and puddle resistant by three means, namely intumescence, cooling during high temperature decomposition and exclusion of air from the fuel. First, when the graft polymer of the invention is exposed to the high temperatures of fire, the graft polymer intumesces. That is, a crusty foam forms on its surface which serves to insulate the remainder of the fuel from the heat of the fire. Secondly, when the graft polymer is exposed to temperatures of 300° C. or higher, the graft polymer endothermically decomposes providing cooling to the area exposed to fire, or very high temperatures, thereby cooling any nearby available fuel to temperatures below the fuel's ignition point. Thirdly, the presence of the non-flammable graft polymer's intumescent surface seals covered materials to effectively exclude air from covered materials and from incidental fuels present in the area, or from the thermoplastic polyamide polymer itself which could be flammable were it to become separated from the contained melamine component.

The graft polymers of the present invention can be prepared from fine melamine compound solid particles having particles with at least 90 percent of the particles 50 microns or less in diameter. The particle lengths are approximately the same dimension as the diameter so that the particles are compact in shape. Long shaped particles make the molten polyamide-oligomer-melamine mixtures difficult to work due to the high viscosity encountered when an appreciable amount of melamine compound is used. Finely divided melamine compounds, i.e. particles, at least 90 percent of which having diameters of 10 microns or less, are preferred since they provide a high surface area for reaction with the polyamide oligomer and polymer. The optimum particle size is approximately 5 microns in diameter. These particle sizes result in the formation of strong grafts between the melamine, oligomer, and polyamide polymer which do not reduce the tensile strength, elasticity or flexibility of the plastic. As the particle size is increased upward to 50 microns, the above physical properties are decreased but remain satisfactory for most commercial uses of non-burning polyamide compositions. However, when the melamine compound particle size is increased beyond 50 microns, while satisfactory tensile strength of the polyamide is substantially maintained, an appreciable reduction in the properties of flexibility and elasticity occurs thereby rendering the polyamide unsuitable for most commercial uses of non-burning polyamides.

The grafts of the present invention, as herein before stated, are effectively prepared only when the oligomer, the melamine compound, and the thermoplastic polyamide polymer are mixed and reacted at about the melting temperature for the polyamide polymer until the graft polymer is formed, and then promptly cooled to a temperature below the softening temperature of the graft polymer. For the polyamide polymers found useful in the present invention, the graft forming reaction was effectively carried out at temperatures of 210° to 330° C.

The molecular weight of the polyamide and its melting point are not reduced significantly under the conditions of the graft polymer formation so long as the product is cooled to a temperature below its softening point in about one minutes time, so that the melting point of the polyamide polymer is reduced no more than about 30° C.

Where the polyamide polymer is heated to about its melting temperature for longer than one minute, the bonds which hold the polyamide polymer become loose thereby allowing depolymerization and formation of oligomer. The amount of oligomer formed depends upon the temperature and the holding time at that temperature. The oligomer is available then to react with a melamine compound and form short side chain additions to the main backbone polymer chain, thereby creating graft polymers containing melamine compound.

The intumescent graft polymer product of this invention is prepared at temperatures of about the melting temperature of the polyamide polymer, above the melting point of the oligomer, and below the melting point of the melamine compound. Since the polyamides, such as nylon, are high melting thermoplastics, i.e., above 200° C., the temperatures to be effective in the present method, are from 210° C. to 330° C. and preferably from 240° to 280° C.

During the grafting coreaction, a catalyst can be advantageously used to decrease the time required for the formation of the grafts. Catalyst suitable for use in the present invention include phosphoric acid, pyrophosphoric acid, sulfuric acid, and ammonium sulfate. Only a small amount of catalyst is required, i.e. from 0.01 to 0.10 percent. The presence of excessive amounts of catalyst was found to impair the physical properties of the polymer. With temperatures at about the melting temperature of the polyamide polymer, the graft polymer formation reaction can usually be carried out expditiously without the addition of catalyst. The polyamide polymers frequently retain small amounts of catalyst from their original formation.

The amount of melamine compound combined with the oligomer and the thermoplastic polyamide to form the graft polymer must be substantial in order to achieve the desired intumescent fire retardancy and the reduction of puddling and dripping properties. In the methods provided in the prior art, however, substantial amounts of melamine fire retardant have been reported to degrade or deteriorate the mechanical properties of the thermoplastic thereby rendering it unsuitable for many uses. In the method of the present invention, from about 10 to 40 percent by weight melamine compound, based on the total weight of the thermoplastic polyamide graft polymer, can be used resulting in the formation of a fire retardant graft polymer which is intumescent and highly resistant to dripping and puddling without degradation of the polymer properties, in particular the properties of tensile strength, elasticity and flexibility. The preferred range of melamine compound is from about 20 to 30 percent, with the most preferred range being from about 24 to 30 percent. It has been found that melamine concentrations above 40 percent, however, serve to undesirably lessen the elasticity and flexibility of the polyamide thermoplastics by making the polymer brittle and difficult to injection mold.

The mechanism by which the formed graft polymer remains together, intumesces, and resists puddling and dripping in the environment of fire is not presently completely understood. However, it is speculated that the physical structure of the graft polymer remains stable at elevated temperatures and, therefore, the low viscosity liquids which could form puddles and cause separation of the thermoplastic from the fire retardant does not occur, contrary to the results obtained with blends of thermoplastic polymer and melamine as previously known in the art.

The method of preparing the product of the present invention can be carried out using conventional equipment of the thermoplastic industry. A stepwise description of the preferred method of the present invention is as follows: (1) heating the thermoplastic polyamide polymer, which is capable of forming ternary graft polymers with an oligomer and a melamine compound at a temperature about at the polyamide's melting point; (2) admixing the melamine compound and an oligomer reactive with the melamine and the polyamide with the thermoplastic polyamide and holding the mixture under these conditions until a graft polymer is formed between the reactive oligomer, the melamine, and the thermoplastic polyamide polymer; and (3) cooling the graft polymer to prevent appreciable depolymerization. Alternatively, the thermoplastic and melamine compound can be premixed prior to mixing with the oligomer and heating to about the melting temperature of the polyamide polymer so long as the mixture is subjected to the necessary conditions. The thermoplastic polyamide polymer and melamine compound may be mixed in the form of a powder, granules and pellets. Specifically, the polymer is normally used as pellets or molding powders which are dry blended with a melamine compound of a particular particle size. The oligomer contains between 1 and 4 monomer units of the polyamide polymer or between 1 and 4 monomer units reactive with the polymer and the melamine compounds. The oligomer is normally liquid and injected into the reaction mixture. The reaction is best carried out in a pressure mixer, such as a single screw mixer, but preferably in a double screw mixer where the product is extruded in a form which may be quickly cooled. A catalyst is added with the polymer, if used. The thermoplastic graft polymer after the grafting has occurred is cooled by extruding the mixture into a cooling medium where it solidifies as pellets or chips. The pellets or chips are suitable for use in injection molding or other uses which require fire retardant thermoplastics.

In a modification to the preferred embodiment, other additives conventionally known can be introduced into the final product after the melamine-oligomer-polyamide polymer graft is formed to affect the final properties of the graft composition. Such extraneous additives include glass fibers, clays, limestone, glass cloth, metal fibers, and oxidation inhibitors.

EXAMPLE 1

Example 1 demonstrates the method of preparing the intumescent non-burning polyamide-oligomer-melamine compound graft composition of the present invention.

Seventy-three (73) parts by weight of a thermoplastic polyamide polymer in the form of polycondensed caprolactam, i.e. nylon 6, was dry blended in the form of pellets with 24 parts by weight of fine trimelamine isocyanurate powder. The nylon 6 had a relative viscosity of 2.3 as determined in a solution of 1 gram of nylon 6 in 100 ml of 98% sulfuric acid measured in a Ubbelohde Viscometer at 25° C. The particle size distribution of the melamine powder was as follows:

| Particle Diameter, microns | Wt. % |
| --- | --- |
| smaller than 1 | 4 |
| 1–5 | 81 |
| 5–20 | 9 |
| larger than 20 | 6 |

The dry trimelamine isocyanurate powder and nylon 6 pellets having a median diameter of about 3 mm were batch blended at ambient temperature in a double cone Patterson-Kelly Blender for 10 minutes. The blended nylon 6 and melamine compound powder, amounting to 250 pounds, were then charged to a feed hopper for continuously feeding to a mixer-reactor.

The mixer-reactor utilized was a ZSK Twin-Screw Machine produced by Werner and Pfleiderer Corporation. It was equipped with twin co-rotating screws. The screws were self-wiping and provided positive conveyance of its contents. The residence time was controlled by the speed of the variable-speed screws. The temperature of the mixture was controlled with heaters located on the barrel surrounding the twin screws. The length to diameter ratio of the ZSK Machine was 24:1.

The oligomer used was partially condensed caprolactam comprising between 2 and 3 monomer units of caprolactam. Three parts by weight was supplied as a liquid at 130° C. and injected directly into the front end of the twin screw mixer there comingling with the premixed melamine and polyamide polymer. The oligomer advanced and coreacted with the melamine and the polyamide polymer as the ingredients advanced along the barrel of the mixer-reactor.

In the ZSK Machine, the nylon 6 was heated and melted along with the oligomer and melamine to 240° C. Feed rates were controlled to provide a 43 second holdup time. A 6° C. decrease in the melting point of the nylon 6 was observed after the material passed through the ZSK Machine. Under these conditions, the reaction of the melamine with the oligomer and the nylon 6 was carried out and the polyamide-oligomer-melamine graft polymer was formed.

The graft product was discharged from the ZSK Machine as a continuous fluid extrusion which was immediately chopped into small pieces and quenched to a temperature of 40° C., well below the softening point of nylon-6, by turbulent cooling water to form solid pellets. The pellets were dried at 88° C. for 12 hours under a vacuum. Some of the pellets were injection molded into test specimens for fire and physical evaluation tests. The specimens were sized into 5"×½" pieces having thicknesses of ¹⁄₁₆", ⅛", and ¼".

EXAMPLE 2

This example demonstrates that the product of Example 1 is non-burning. The product of Example 1 was compared with untreated nylon 6 using Underwriters Laboratory Test Method 94. Underwriters Laboratory (U.L.) Test Method 94 determines the distance a test piece of plastic burns before it self-extinguishes as described in U.L. literature. A rating of V-0 indicates that the test piece burned for no appreciable time or distance after the test piece was removed from a fire source. The results are as follows:

| Test Material | UL-94 Test Result |
| --- | --- |
| Example 1 product | V-0 |
| Untreated Nylon 6 | V-2 |

EXAMPLE 3

This example demonstrates that the non-burning product of Example 1 has substantially the same tensile strength, flexibility and elasticity as the original polyamide utilized in making the product and that these properties are much superior to those present in a product obtained by rapid blending of the same ingredients without formation of the melamine-oligomer-polyamide grafts. These properties were evaluated according to ASTM Method D-638-56T of Tensile Strength, Elongation, and Flex Modulus. The results are as follows:

| Materials | Tensile Strength lbs/in$^2$ | Elongation % | Flex Modulus × 10$^5$ |
| --- | --- | --- | --- |
| Example 1 product | 11430 | 26 | 4.7 |
| Untreated Nylon 6 | 11494 | 32 | 4.1 |
| Untreated Nylon 6 + 24% unreacted melamine | 5810 | 2 | 6.5 |

The tensile strength of the Example 1 product was about the same as that of the original nylon 6 even though the product of Example 1 contained 24 percent trimelamine isocyanurate. The elongation was reduced only from 32 percent to 26 percent while the elongation at break was reduced 16 fold when regular melamine powder was merely blended with the nylon 6 at the lowest temperature and time possible, i.e. 213° C. for 15 seconds. This blended material also gave a poor Flex Modulus of 6.5 compared to 4.7 for the Example 1 product and 4.1 for the untreated nylon 6.

EXAMPLE 4

This example demonstrates the resistance to puddling and dripping of the product of the present invention under conditions of fire environments. The product of Example 1 was injection molded into a circular disk ¹⁻¾" in diameter and ⅛" thick. This disk was placed on a dry pine board which was 2" wide, ½" thick, 8" long and positioned at a 300° angle to a steel supporting base. The pine board was ignited with a torch and the board allowed to burn completely after removing the torch. Ashes and charred wood was all that remained of the pine board. The disk of the Example 1 product did not burn, puddle or drip from the board. The disk remained in place on the board and the section of board beneath the disk was largely unburned. The disk was discolored but never caught fire and burned.

EXAMPLE 5

This example demonstrates that the thermoplastic melamine-oligomer-polyamide polymer grafts may be prepared using an oligomer which is reactive with the melamine compound but comprises 1–4 monomer units different from those in the polyamide polymer. In this example, 75 parts by weight of the nylon 6 used in Example 1 was premixed with 23 parts by weight of melamine and 2 parts by weight of liquid maleic anhydride was injected as oligomer into the ZSK Twin Screw operating at a maximum temperature of 280° C. with a 42 second retention time to form a melamineoligomer-polyamide polymer graft. The graft reaction reduced the melting point of the nylon by 15° C., increased the nylon's process fluidity, and increased the flexibility of the final product. The product of this example was prepared using the same processing equipment as Example 1. The results of the comparative evaluations are as follows:

| Materials | UL-94 Rating | Elongation % | Flex Modulus × $10^5$ |
|---|---|---|---|
| Example 5 Product | V-0 | 27 | 4.2 |
| Nylon 6 | V-2 | 32 | 4.1 |

EXAMPLE 6

This example shows the effect on the mechanical properties of nylon 66 with 4 percent by weight adipic acid-hexamethylene diamine oligomer containing about four monomer units as the amount of melamine grafted in accordance with the process of the present invention as described above was increased from 0 to 28 percent.

This example also demonstrates effectiveness of using particles of melamine, 90 percent of which have diameters less than 10 microns, to preserve the properties of tensile strength, flexural strength, flexural modulus, elongation, and Vicat Temperature. The test results are tabulated as follows:

| Melamine, Wt % | 0 | 10 | 20 | 28 |
|---|---|---|---|---|
| Tensile Strength, psi | 10800 | 10600 | 10280 | 11420 |
| Elongation, % | 20 | 19 | 18 | 18 |
| Flexural Strength, psi | 14000 | 14400 | 14880 | 15430 |
| Flexural Modulus × $10^5$, psi | 3.5 | 4.87 | 5.32 | 5.45 |
| Vicat Temp., °C. | 235 | 220 | 225 | 232 |

The composition and method of the present invention are useful in injection molding, slab plastic boards, and generally for engineering plastics. The products formed from the composition of the invention can be used in the manufacture of microwave ovens, television and radio cabinets, air ducts in heating and cooling operations, furniture, construction and building members, and other conventionally known uses for non-burning thermoplastic compositions.

As will be apparent to one skilled in the art, various modifications can be made within the scope of the aforesaid description. Such modifications being within the ability of one skilled in the art form a part of the present invention and are embraced by the appended claims.

I claim:

1. A method of preparing an intumescent fire retardant thermoplastic polyamide graft polymer comprising:
   (a) heating between 40 and 95 parts of a thermoplastic polyamide polymer, exhibiting a property of forming graft polymers with its oligomers, to about its melting temperature;
   (b) mixingly reacting the thermoplastic polyamide at about its melting point with between 1 and 10 parts of an oligomer, containing between 1 and 4 monomer units of the thermoplastic polyamide, and which exhibits a property of reacting with an amino group of a melamine compound;
   (c) further mixingly reacting the thermoplastic polyamide and the oligomer with between 10 and 40 parts of a melamine compound, wherein the melamine compound is a member of the group of compounds consisting of melamine, melamine phosphate, melamine cyanurate, melamine borate, methylol melamine and trimelamine isocyanurate, containing at least one amino group available for reaction, until the melamine compound additively reacts with the thermoplastic polyamide polymer, to form a grafted polymer; and,
   (d) cooling the graft polyamide polymer to a temperature lower than its softening point in less than about one minute.

2. A method according to claim 1 wherein the thermoplastic polyamide resin is a member of the group consisting of a polycondensation product of a linear dicarboxylic acid and a linear diamine, a polymer of a lactam having a ring with more than three members, and an alpha amino acid polymer.

3. A method according to claim 1 wherein the polyamide is a nylon polymer.

4. A method according to claim 1 wherein the reaction is carried out at a temperature between 210° C. and 330° C.

5. A method according to claim 1 wherein the oligomer is formed by depolymerization of the thermoplastic polyamide polymer.

6. A method according to claim 1 wherein the melamine compound comprises fine particles, at least 90 percent of which are smaller than 50 microns in diameter.

7. A method according to claim 1 wherein the melamine compound particles in the fire retardant thermoplastic polyamide polymer amount to between 20 and 30 parts by weight, with at least 90 percent of the particles exhibiting diameters of 10 microns or less.

8. A method according to claim 1 wherein the melamine compound in the fire retardant polyamide polymer is trimelamine isocyanurate.

9. A method according to claim 1 wherein the melamine compound is melamine.

10. A method according to claim 1 wherein the oligomer reacted amounts to between 1 and 5 parts by weight.

11. A method of preparing an intumescent fire retardant thermoplastic polyamide graft polymer comprising:
   (a) heating between 40 and 95 parts of a thermoplastic polyamide polymer, exhibiting a property of forming graft polymers with its oligomers, to about its melting temperature;
   (b) mixingly reacting the thermoplastic polyamide at about its melting point with between 1 and 10 parts of an oligomer, not of the thermoplastic polyamide polymer, which exhibits a property of reacting with the polyamide polymer and with an amino group of a melamine compound, the oligomer containing between 1 and 4 monomer units of a member of the group consisting of caprolactam, hexamethylene diamine-adipic acid reaction product, maleic anhydride, and methylene di-para-phenylene isocyanate;
   (c) further mixingly reacting the thermoplastic polyamide and the reactive oligomer with between 10 and 40 parts of a melamine compound, wherein the melamine compound is a member of the group of compounds consisting of melamine, melamine phosphate, melamine cyanurate, melamine borate, methylol melamine, and trimelamine isocyanurate, containing at least one amino group available for reaction, until the melamine compound additively reacts with the thermoplastic polyamide polymer, to form a grafted polymer; and,
   (d) cooling the graft polyamide polymer to a temperature lower than its softening point in less than about one minute.

12. An intumescent fire retardant grafted thermoplastic polyamide product composition resistant to dripping and puddling when exposed to fire, comprising: from 40 to 95 percent thermoplastic polyamide; from 1 to 10 percent of an oligomer, containing from 1 to 4 monomer units of the thermoplastic polyamide, which exhibits a property of reacting with an amino group of a melamine compound; and from 10 to 40 percent based on the weight of the total composition of a non-resinous melamine compound, wherein the melamine compound is a member of the group consisting of melamine, melamine phosphate, melamine cyanurate, melamine borate, methylol melamine, and trimelamine isocyanurate, coreacted at about the melting temperature of the polyamide polymer.

13. An intumescent product according to claim 12 wherein the mixture is coreacted at a temperature from 240° to 280° C.

14. An intumescent product according to claim 12 wherein the polyamide is a member of the group consisting of a polycondensation product of a linear dicarboxylic acid and a linear diamine, a polymer of a lactam having a ring with more than three members, and an alpha amino acid polymer.

15. An intumescent fire retardant product according to claim 12 wherein the polyamide is a nylon product.

16. An intumescent fire retardant product according to claim 12 wherein extraneous materials, to affect physical properties of the product, selected from the group consisting of glass fibers, clays, limestone, glass cloth, metal fibers and oxidation inhibitors, are included.

17. An intumescent fire retardant grafted thermoplastic polyamide product composition resistant to dripping and puddling when exposed to fire, comprising: from 1 to 10 percent of an oligomer, not of the thermoplastic polyamide polymer, which exhibits a property of reacting with the polyamide polymer and with an amino group of a melamine compound, the oligomer containing between 1 and 4 monomer units of a member of the group consisting of caprolactam, hexamethylene diamine-adipic acid reaction product, maleic anhydride, and methylene di-para-phenylene isocyanate; and between 10 and 40 percent, based on the weight of total composition, of a non-resinous melamine compound, wherein the melamine compound is a member of a group consisting of melamine, melamine phosphate, melamine cyanurate, melamine borate, methylol melamine, and trimelamine isocyanurate, coreacted at about the melting temperature of the polyamide polymer; with from 40 to 95 percent of a thermoplastic polyamide polymer.

18. A method of preparing a non-burning intumescent fire retardant polyamide polymer resistant to dripping when exposed to fire, the method comprising:
 (a) heating from 72 to 80 parts by weight of the polyamide nylon-6, polycondensed caprolactam, to a temperature of about 280° C. in a screw mixer;
 (b) admixing and reacting therewith from 2 to 4 parts by weight of an oligomer of caprolactam, comprising from 3 to 4 monomer units;
 (c) also at about the same time admixing and reacting in the mixer, from 24 to 30 parts by weight of trimelamine isocyanurate powder exhibiting particle diameters of about 5 microns;
 (d) passing the mixing and reacting materials continuously through the screw mixer at a rate to allow the trimelamine isocyanurate to additively react with the caprolactam oligomer and the oligomer to react with the polyamide polymer as a graft in about one minute; and,
 (e) discharging the fire retardant polyamide graft polymer from the screw mixer and quenching to a temperature of 40° C. in less than one minute.

19. A method of preparing a non-burning intumescent fire retardant polyamide polymer resistant to dripping when exposed to fire, the method comprising:
 (a) heating from 72 to 80 parts by weight of the polyamide nylon-66, polycondensed adipic acid-hexamethylene diamine, to, a temperature of about 280° C. in a screw mixer;
 (b) admixing and reacting therewith from 2 to 4 parts by weight of an oligomer of adipic acid-hexamethylene diamine monomer, comprising from 3 to 4 monomer units;
 (c) also at about the same time admixing and reacting in the mixer, from 24 to 30 parts by weight of trimelamine isocyanurate powder exhibiting particle diameters of about 5 microns;
 (d) passing the mixing and reacting materials continuously through the screw mixer at a rate to allow the trimelamine isocyanurate to additively react with the adipic acid-hexamethylene diamine oligomer and the oligomer to react with the polyamide polymer as a graft in about one minute; and, (e) discharging the fire retardant polyamide graft polymer from the screw mixer and quenching to a temperature of 40° C. in less than one minute.

20. A method of preparing a non-burning intumescent fire retardant polyamide polymer resistant to dripping when exposed to fire, the method comprising:
 (a) heating from 72 to 80 parts by weight of the polyamide nylon-6, polycondensed caprolactam, to a temperature of about 280° C. in a screw mixer;
 (b) admixing and reacting therewith from 2 to 4 parts by weight of an oligomer of maleic anhydride monomer;
 (c) also at about the same time admixing and reacting in the mixer, from 24 to 30 parts by weight of trimelamine isocyanurate powder exhibiting particle diameters of about 5 microns;
 (d) passing the mixing and reacting materials continuously through the screw mixer at a rate to allow the trimelamine isocyanurate to additively react with the maleic anhydride oligomer and the oligomer to react with the polyamide polymer as a graft in about one minute; and, (e) discharging the fire retardant polyamide graft polymer from the screw mixer and quenching to a temperature of 40° C. in less than one minute.

* * * * *